(12) United States Patent  
Loeppen et al.

(10) Patent No.: US 12,311,994 B2  
(45) Date of Patent: May 27, 2025

(54) OPERATING ELEMENT COMPRISING AN ACTUATION PART HAVING A LAYER STRUCTURE

(71) Applicant: Preh GmbH, Bad Neustadt a.d. Saale (DE)

(72) Inventors: Dennis Loeppen, Frankenheim (DE); Frank Dangel, Petersberg (DE); Tobias Bodenstein, Salz (DE); Peter Lochner, Wollbach (DE); Jochen Schuhmann, Bad Kissingen (DE)

(73) Assignee: Preh GmbH, Saale (DE)

( * ) Notice: Subject to any disclaimer, the term of this patent is extended or adjusted under 35 U.S.C. 154(b) by 125 days.

(21) Appl. No.: 17/760,057

(22) PCT Filed: Jul. 28, 2021

(86) PCT No.: PCT/EP2021/071116  
§ 371 (c)(1),  
(2) Date: Aug. 3, 2022

(87) PCT Pub. No.: WO2022/028977  
PCT Pub. Date: Feb. 10, 2022

(65) Prior Publication Data  
US 2023/0347963 A1    Nov. 2, 2023

(30) Foreign Application Priority Data

Aug. 5, 2020    (DE) .................... 10 2020 120 711.5

(51) Int. Cl.  
*B62D 1/04*    (2006.01)  
*B32B 7/022*    (2019.01)  
(Continued)

(52) U.S. Cl.  
CPC .............. *B62D 1/046* (2013.01); *B32B 7/022* (2019.01); *B32B 25/08* (2013.01); *B32B 25/16* (2013.01);  
(Continued)

(58) Field of Classification Search  
CPC .... H01H 13/14; H01H 2221/044; G05G 1/02; G05G 2505/00; G05G 5/03; B60K 35/10; (Continued)

(56) References Cited

U.S. PATENT DOCUMENTS 5,823,666 A * 10/1998 Kingsolver .......... B60Q 1/1484  
                                                                    200/61.54  
6,737,596 B1    5/2004 Hein  
2014/0285319 A1 * 9/2014 Khan ....................... G07C 9/00  
                                                                    340/5.61

FOREIGN PATENT DOCUMENTS

DE    102009030592 A1    12/2010  
DE    102006007959          2/2020  
(Continued)

OTHER PUBLICATIONS

The German Office Action of German Application No. 102020120711. 5, German Patent and Trademark Office (DPMA), München, Germany, Dated: Jun. 21, 2021.  
(Continued)

*Primary Examiner* — Anthony R Jimenez  
(74) *Attorney, Agent, or Firm* — M&B IP Analysts, LLC

(57) ABSTRACT

The present disclosure relates to an operating member including a support; an actuating part, which has an actuating surface facing towards an operator, and the actuating part has an edge region, which is provided outside the actuating surface and via which the actuating part is supported on the support; wherein the actuating part has a layer structure, defining the actuating surface, and the layer structure has at  
(Continued)

least two layers that differ in the modulus of elasticity; wherein, in a transitional region between the edge region and the actuating surface, a layer with the smallest modulus of elasticity is a highly elastic layer, and has the greatest layer thickness compared to other layers of the layer structure, in order to provide an elastic compliance of the actuating part; a force sensor disposed between the support and the actuating part detects a displacement of the actuating part.

17 Claims, 3 Drawing Sheets

(51) Int. Cl.
| | |
|---|---|
| *B32B 25/08* | (2006.01) |
| *B32B 25/16* | (2006.01) |
| *B32B 27/08* | (2006.01) |
| *B32B 27/36* | (2006.01) |
| *B32B 27/40* | (2006.01) |
| *B60K 35/10* | (2024.01) |
| *B60K 35/60* | (2024.01) |
| *G05G 1/02* | (2006.01) |
| *G05G 5/03* | (2008.04) |
| *H01H 13/14* | (2006.01) |

(52) U.S. Cl.
CPC ............ *B32B 27/08* (2013.01); *B32B 27/365* (2013.01); *B32B 27/40* (2013.01); *B60K 35/10* (2024.01); *G05G 1/02* (2013.01); *G05G 5/03* (2013.01); *H01H 13/14* (2013.01); *B32B 2307/51* (2013.01); *B32B 2307/7376* (2023.05); *B60K 35/60* (2024.01); *B60K 2360/128* (2024.01); *B60K 2360/782* (2024.01); *G05G 2505/00* (2013.01); *H01H 2221/044* (2013.01)

(58) Field of Classification Search
CPC .............. B60K 35/60; B60K 2360/128; B60K 2360/782; B32B 7/022; B32B 27/08; B32B 27/365; B32B 27/40; B32B 25/24; B32B 25/25; B32B 25/08; B32B 25/16; B32B 2307/51; B32B 2307/7376; B32B 27/36; B62D 1/046; B62D 1/04
USPC ....................................................... 200/61.57
See application file for complete search history.

(56) References Cited

FOREIGN PATENT DOCUMENTS

| | | | |
|---|---|---|---|
| EP | 1412807 | A2 | 4/2004 |
| EP | 1465118 | A2 | 10/2004 |
| EP | 2325857 | A1 | 5/2011 |
| WO | 2008006710 | A1 | 1/2008 |

OTHER PUBLICATIONS

The International Search Report and Written Opinion for PCT Application No. PCT/EP2021/071116, European Patent Office (EPO), Rijswijk, Netherlands, Dated: Nov. 22, 2021.

* cited by examiner

OPERATING ELEMENT COMPRISING AN ACTUATION PART HAVING A LAYER STRUCTURE

The present disclosure relates to an operating member with an actuating part having an actuating surface for an operator to perform an operating input. A force sensor system is assigned to the actuating part, in order to detect an actuation of the actuating part that exceeds a touch. An actuation is understood to be a displacement of the actuating part under the influence of an actuating force that is applied by an operator and acts on the actuating surface. To this end, the actuating part, as a rule, is supported on a support in an elastically yielding manner. The elastic displacement also has the function of generating a so-called passive haptic feedback resulting from the force-path behavior during actuation. In addition, the elastic support also has the function of damping a movement of the actuating part that is generated by an actuator by means of an electrical control signal and is supposed to produce a so-called active haptic feedback for the operator, of acting in a resetting manner and/or of acting as a vibration insulation with respect to the support. In the cases of the actuating part being movably supported, be it for reasons of a resetting movability (passive feedback) and/or because of the active haptic feedback, there arises the problem that a clear distance has to be maintained in a transitional region between the actuating part and the support, in particular between the actuating part and a panel fixed to the support, in order to ensure movability. On the one hand, this clear distance entails the risk of the entry of foreign bodies, such as a fluid or dust particles, whereby the operational capability of the operating member is put at risk. On the other hand, the setting of a gap width between the panel and the actuating part, which is to be uniform for aesthetic reasons, moreover presents enormous challenges with regard to the assembly of the operating member.

Against this background, there was a demand for a solution for an operating member with an elastically yielding actuating part, which is improved with regard to the constructional link to the support, in order thus to hinder the intrusion of foreign particles and, in particular, achieve a more visually attractive appearance in the transitional region between the support or panel and the actuating part, among other things. This object is achieved with an operating member according to claim 1. An equally advantageous use is the subject matter of the independent claim. Advantageous embodiments are in each case the subject matter of the dependent claims. It must be noted that the features cited individually in the claims can be combined with each other in any technologically meaningful manner and represent other embodiments of the present disclosure. The description, in particular in connection with the figures, additionally characterizes and specifies the disclosed embodiments.

The present disclosure relates to an operating member. The term "operating member" is to be interpreted broadly and serves for performing an operating input by means of a movable actuating part within the context of a man-machine interface.

The operating member according to the present disclosure comprises a support. The term "support" is to be interpreted broadly and denotes a component which is a part of a supporting structure or is indirectly or directly fixed, for example, to a motor vehicle component. For example, the support is configured as a slip-on housing. For example, the support is formed from a plastic, a metal or a metallic alloy, such as ZAMAK, or combinations thereof.

According to the present disclosure, an actuating part is also provided, which has an actuating surface facing towards an operator, for an operator to carry out an operating input. An actuating operating input is understood to be an actuation, particularly with a simultaneous touch, by an operator, which goes beyond a touch, during which the operator applies an actuating force acting perpendicularly on the actuating surface, in order to cause a displacement of the actuating part, which follows the actuating force, in this case while elastically, partially deforming the actuating part. According to the present disclosure, the actuating part further has an edge region, which is provided outside the actuating surface, which preferably surrounds the actuating surface, which more preferably is an outer edge region, and via which the actuating part is supported on the support.

According to the present disclosure, the actuating part has a layer structure, preferably a film layer structure, defining the actuating surface. According to the present disclosure, the layer structure has at least two layers including of one thermoplastic material each. According to the present disclosure, at least two of the layers, i.e. more specifically the materials used in each case for forming the layers, are different from each other with respect to the modulus of elasticity. According to the present disclosure, a transitional region is provided between the edge region and the actuating surface. The transitional region is characterized in that, in the transitional region, the layer with the smallest modulus of elasticity of the two layers, which is referred to as a highly elastic layer, has the greatest layer thickness, measured in a direction perpendicular to the actuating surface, as compared with a layer thickness of the other layers of the layer structure in the same transitional region, in order to provide an elastic compliance of the actuating part in a direction perpendicular to the actuating surface. Preferably, in the transitional region, a high-strength layer having the greatest modulus of elasticity of the several layers of the layer structure is removed, i.e. not provided, so that at least the highly elastic layer remains in the transitional region, e.g. only a film of the film layer structure and the highly elastic layer.

According to the present disclosure, a force sensor is provided that is disposed and/or acts between the support and the actuating part, in order to detect a displacement of the actuating part in the direction perpendicular to the actuating surface. The term "force sensor" is to be interpreted broadly: According to a simple configuration, it is an electromechanical switch that changes its switching state depending on the position of the actuating part. In one configuration, it is a contactlessly detecting force sensor, such as a force sensor that capacitively, optically and/or inductively detects the actuating force. In another configuration, the force sensor is designed to detect the actuating force based on a mechanical influence acting on a component of the force sensor, such as a resistively or piezoelectrically detecting force sensor. Preferably, the force sensor is configured for detecting, for instance capacitively, the relative displacement between the actuating part and the support, by a determination of a change in measuring capacitance between an electrode fixed to the actuating part and an electrode fixed to the support.

Due to its placement, the highly elastic layer provides for a locally pronounced elastic compliance in the region of the actuating part surrounding the actuating surface. Moreover, an elastic support of another type can be dispensed with. The highly elastic layer ensures a liquid-tight transition between the actuating surface and the support. Moreover, the actuating part, together with its elastic support, may thus be manufactured in a single manufacturing step, e.g. by thermal molding in a molding tool. The manufacture and assembly of the operating member is thus simplified. A movability of the actuating surface of the actuating part is provided by the highly elastic layer, without the necessity of a gap between the support and the actuating part. Moreover, the highly elastic layer provides for a reliable resetting and prevents an overloading of the actuating part material exceeding the elastic stresses. Thus, plastic, non-reversible deformations of the actuating part are reliably avoided. In addition to the actuating surface, the transitional region preferably also is a visible surface, i.e. is disposed so as to be freely accessible to the operator. Preferably, the actuating surface, transitional region and edge region form a contiguous, continuously and steadily transitioning visible surface facing towards the operator.

Preferably, the layer structure, or film layer structure, is formed in an integral manner, for example by the layers or the film being connected to each other by substance-to-substance connection.

Preferably, a weakened-material portion in the layer structure, which at least in some areas surrounds the actuating surface and optionally extends completely around the actuating surface, is formed in the transitional region situated between the edge region and the actuating surface, in order to provide for an elastic compliance of the actuating part in a direction perpendicular to the actuating surface.

In one configuration, the extent of the weakened-material portion in the circumferential direction related to the actuating surface is adapted to the extent of the edge region with which the actuating part is supported on the support. For example, the actuating part has a free edge portion which is not supported on the support.

For example, the weakened-material portion is configured in such a way that it reaches through all layers with the exception of the highly elastic layer and the optional film of the layer structure. In one configuration, the weakened-material portion protrudes into the highly elastic layer without penetrating it in the transitional region. Due to its placement, the weakened-material portion provides for a locally pronounced elastic compliance in the region of the actuating part surrounding the actuating surface.

Preferably, the weakened-material portion is formed by a groove provided on the side of the actuating part facing away from the operator, so that the surface of the actuating part facing towards the observer, which contains the actuating surface and the surface of the edge region facing towards the observer, is not penetrated by the groove.

In order to mechanically stabilize the actuating part, particularly in the region of the actuating surface, the high-strength layer having the greatest modulus of elasticity of the several layers extends substantially parallel to the actuating surface.

Preferably, the high-strength layer having the smallest modulus of elasticity of the several layers is formed from a thermoplastic material, such as polyethylene (PE), polycarbonate (PC), polystyrene (PS), polyvinyl chloride (PVC), polyamide (PA), acrylonitrile butadiene styrene (ABS) or polymethyl methacrylate (PMMA). Preferably, the high-strength layer includes PC or ABS.

In a preferred embodiment of the operating member according to the present disclosure, an actuator, which is disposed between the support and the actuating part, is further provided for exciting the vibration and/or movement of the actuating part, and thus for generating an active haptic feedback. The actuator is an active actuator, i.e. an actuator which can be triggered by a control signal provided by an electronic control system, and which, due to the application of a pulse, such as an impact, or the application of vibration to the adjacently disposed component, i.e. the actuating part, is capable of exciting movement or vibration in the latter, which is haptically perceptible by the operator via the finger resting on the actuating surface. For example, this haptic perception serves as a confirmation signal for an executed touch or actuation, or as a haptic acknowledgement of an evaluating unit performing the assignment of a switching or controlling function. Preferably, the actuator is an inertia-based, motor-based actuator, such as a motor on whose rotating drive shaft a mass is mounted eccentrically with respect to its center of gravity, or a magnetic coil actuator, or a piezoelectric actuator, or a linear wide-band actuator, such as a voice coil actuator or a linear resonance actuator. Preferably, the actuator is exclusively fixed to the actuating part in a positive manner or by substance-to-substance connection, e.g. by screwing or gluing. An electromagnetic actuator that acts in an attracting or repelling manner between the support and the actuating part may also be provided.

Preferably, the highly elastic layer is formed from a thermoplastic elastomer, such as a thermoplastic polyurethane, or a thermoplastic vulcanizate, such as a vulcanizate comprising an ethylene-propylene-diene rubber.

Preferably, the highly elastic layer has a Shore A hardness in the range from more than 55 to less than 95, more preferably in the range from 65 to 85.

As mentioned above, the layer structure preferably is a film layer structure containing a film, such as a polycarbonate film (PC film). More preferably, the film is an outer layer of the film layer structure forming the actuating surface.

Preferably, the film forms a common visible surface extending across the actuating surface, the transitional region and the edge region.

The input part is produced as follows, for instance: In a first molding step, a thermoplastic material, such as PC or ABS, is formed into a molded article forming the high-strength layer of the film layer structure to be produced. In a subsequent step, a film, such as a PC film, and the molded article are inserted into the cavity of a molding tool, with a hollow space remaining between them. In a subsequent injection-molding step, the hollow space is filled with the further thermoplastic material, such as the thermoplastic elastomer or the thermoplastic vulcanizate in a thermal injection-molding step, in order to form an integral film layer structure whose layers or films are connected to one another by substance-to-substance connection.

Preferably, the actuating part has a through-hole in which is disposed an electronic or electromechanical input part that can be operated manually, such as a rotary knob or a roller knob that can preferably be operated with the thumb of the hand resting on the steering wheel rim.

Moreover, a capacitive touch sensor system for detecting a touch upon the operating part may be provided in the region of the actuating surface. For example, at least one conductive layer applied to the side of the actuating part facing away from the operator is provided, in order to provide an electrode structure of the electric touch sensor system for detecting a touch upon the actuating surface. For example, the conductive layer or the several layers form an array of electrodes that serve for the capacitive, spatially resolved detection of a touch upon the actuating surface. The methods for touch detection are known to the person skilled in the art; for example, different potentials are applied to the electrodes in order to generate a measuring field penetrating the actuating surface and defining a measuring capacitance, which is influenced upon being touched by the operator. The influence on the measuring capacitance resulting therefrom is detected by an evaluation unit. According to a preferred embodiment, given a uniform spatial distribution of the array across the actuating surface, a spatially resolving detection of the touch upon the actuating surface is made possible.

According to a preferred embodiment of the operating member, the actuating surface comprises at least one luminous surface to be backlit, which represents the shape and/or the outline of a symbol, for example. In this case, at least one layer of the layer structure forms a recess or a through-hole for forming a light channel, in order to guide light from a light source fixed to the support to the luminous surface for backlighting.

The present disclosure further relates to an assembly of an operating member according to any one of the above-described embodiments and a motor vehicle steering wheel, wherein the operating member is disposed in the region of a spoke of the motor vehicle steering wheel extending between a steering wheel rim and a steering wheel hub. Preferably, the actuating part is integrally formed, via the edge region, with a panel extending about an impact absorber covering the steering wheel hub. For example, the support and the panel are rigidly connected to one another.

Furthermore, the present disclosure relates to the use of the operating member in one of the above described embodiments in a motor vehicle.

The various embodiments are explained further with reference to the following Figures. The Figures are to be understood only as examples and each merely represent a preferred embodiment. In the Figures:

FIG. 1 shows a first embodiment of the operating member 1 according to the disclosed embodiments. It serves for performing an operating input by means of a movable actuating part 2 within the context of a man-machine interface.

Figure 1:
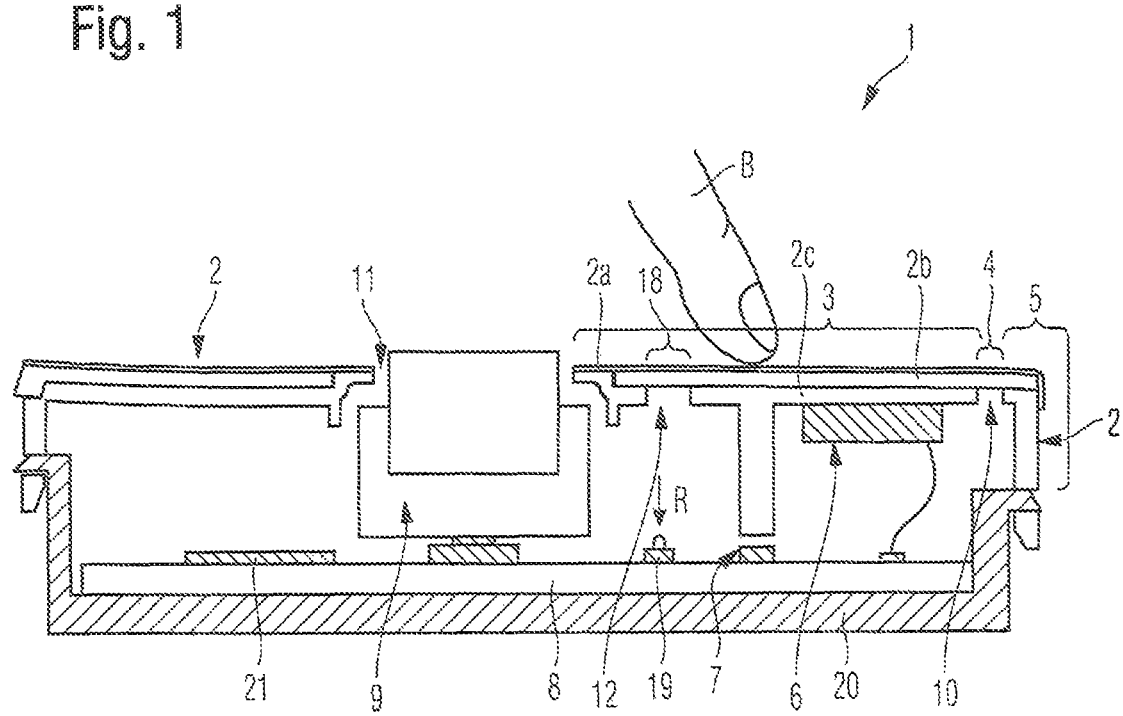
FIG. 1 shows a sectional view of an embodiment of the operating member 1 according to an embodiment.

The operating member 1 according to the embodiment comprises a support 20. The term "support" denotes a component which is a part of a supporting structure or is indirectly or directly fixed, for example, to a motor vehicle component, such as a motor vehicle steering wheel. Here, the support 20 is configured as a slip-on housing. For example, the support 20 is formed from a plastic, a metal or a metallic alloy, such as ZAMAK, or combinations thereof.

Further, an actuating part 2 is provided, which has an actuating surface 3 facing towards the operator B, for an operator B to carry out an operating input. An actuating operating input is understood to be an actuation, particularly with a simultaneous touch, by the operator B, which goes beyond a touch, during which the operator B applies an actuating force acting perpendicularly on the actuating surface 3, in order to cause a displacement of the actuating part 2, which follows the actuating force, in this case while elastically, partially deforming the actuating part 2. The actuating part 2 further has an outer edge region 5, which is provided outside the actuating surface 3, which surrounds the actuating surface 3, and via which the actuating part 2 is supported on the support 20.

In addition, the actuating part 2 has a layer structure 2a, 2b, 2c configured as a film layer structure, which defines the actuating surface 3. The layer structure 2a, 2b, 2c comprises a film 2a and two layers 2b, 2c including one thermoplastic material each. At least two of the layers 2b, 2c, i.e. more specifically the materials used in each case for forming the layers, are different from each other with respect to the modulus of elasticity. A transitional region 4 is provided between the edge region 5 and the actuating surface 3. The transitional region 4 is characterized in that the layer with the smallest modulus of elasticity of the two layers, which is referred to as a highly elastic layer 2b, has the greatest layer thickness, measured in a direction R perpendicular to the actuating surface 3, as compared with a layer thickness of the other layers 2a, 2c of the layer structure 2a, 2b, 2c in the transitional region 4, in order to provide an elastic compliance of the actuating part 2 in the direction R perpendicular to the actuating surface 3. More specifically: here, only precisely one, and only the one, highly elastic layer 2b is provided in the transitional region 4.

Furthermore, a force sensor 7 is provided that is disposed between the support 20 and the actuating part 2, in order to detect the displacement of the actuating part 2 in the direction R perpendicular to the actuating surface 3. Here, this is a capacitively detecting force sensor 7.

Due to its placement in the transitional region 4, the highly elastic layer 2b provides for a locally pronounced elastic compliance in this region of the actuating part 3 surrounding the actuating surface 3. Moreover, an elastic support of another type can be dispensed with. The highly elastic layer 2b moreover ensures a liquid-tight transition between the actuating surface 3 and the support 20. Moreover, the actuating part 2, together with its elastic support, may thus be manufactured in a single manufacturing step, e.g. by thermal molding in a molding tool. The manufacture and assembly of the operating member 2 is thus simplified. A movability of the actuating surface 3 of the actuating part 2 is provided by the highly elastic layer 2b, without the necessity of a gap between the support 20 and the actuating part 2. Moreover, the highly elastic layer 2b provides for a reliable resetting and prevents an overloading of the material of the actuating part 2 exceeding the elastic stresses. Thus, plastic, non-reversible deformations of the actuating part 2 are reliably avoided. In addition to not only the actuating surface 3, the transitional region 4 here also is a visible surface, i.e. is disposed so as to be freely accessible to the operator B. Rather, the actuating surface 3, transitional region 4 and edge region 5 form a contiguous, continuously and steadily transitioning visible surface facing towards the operator B.

As seen in FIG. 1, a weakened-material portion 10 in the layer structure 2a, 2b, 2c in the form of a groove provided on the side of the actuating part 2 facing away from the operator B, which portion at least in some areas surrounds the actuating surface, is formed in the transitional region 4 situated between the edge region 5 and the actuating surface 3, in order to provide for an elastic compliance of the actuating part 2 in the direction R perpendicular to the actuating surface 3.

In this case, the weakened-material portion 10 is configured in such a way that it reaches through all layers with the exception of the highly elastic layer 2b and the film 2a of the layer structure 2a, 2b, 2c.

In order to mechanically stabilize the actuating part 2, particularly in the region of the actuating surface 3, the high-strength layer 2c having the greatest modulus of elasticity of the several layers extends substantially parallel to the actuating surface 3.

Furthermore, an actuator 6, which is disposed between the support 20 and the actuating part 2, is provided for exciting the vibration and/or movement of the actuating part 2, and thus for generating an active haptic feedback. The actuator is an active actuator, i.e. an actuator which can be triggered by a control signal provided by an electronic control system 21, and which, due to the application of a pulse, such as an impact, or the application of vibration to the adjacently disposed component, i.e. the actuating part 2, is capable of exciting movement or vibration in the latter, which is haptically perceptible by the operator B via the finger resting on the actuating surface 3. Together with the force sensor 7, the electronic control system 21 is arranged on a circuit board 8 fixed to the support 20.

Furthermore, the actuating part 2 has a through-hole 11 in which is disposed an electronic or electromechanical input part 11 that can be operated manually, such as a rotary knob or a roller knob that can preferably be operated with the thumb of the hand resting on the steering wheel rim. Furthermore, the actuating surface 3 comprises at least one luminous surface 18 to be backlit, which represents the shape and/or the outline of a symbol. In this case, at least one layer 2c of the layer structure 2a, 2b, 2c forms a recess or a through-hole for forming a light channel 12, in order to guide light from a light source 19 fixed to the support 20 and arranged on the circuit board 8 to the luminous surface 18 for backlighting. For example, the layer structure remaining in the region of the luminous surface 18 is configured to be translucent. This is achieved, for example, by the film 2a or the highly elastic layer 2b being provided with an opaque coating that is missing or was removed in the region of the luminous surface 18.

Figure 2:
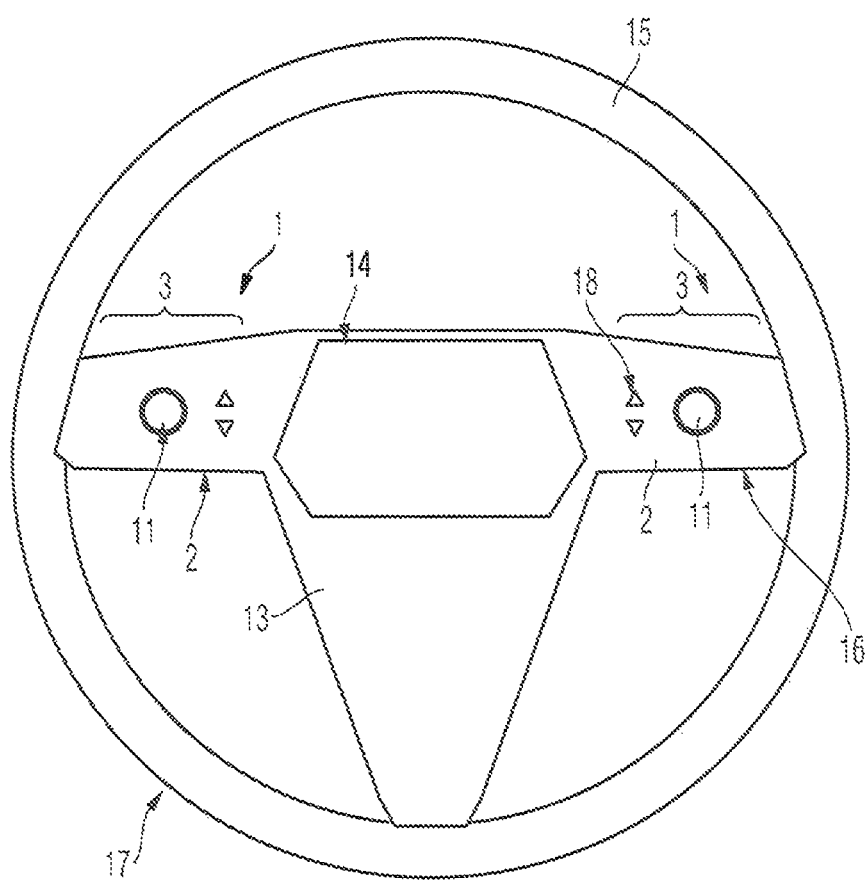
FIG. 2 shows a top view of the assembly according to the embodiment.
Figure 3:
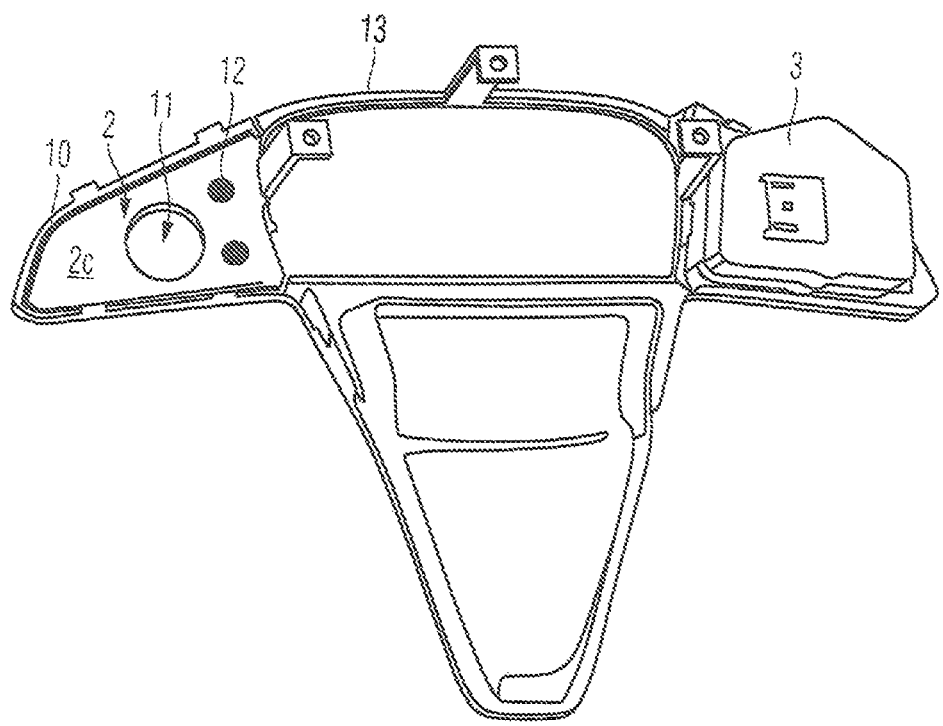
FIG. 3 shows a rear view of the panel of FIG. 2.

FIGS. 2 and 3 show an assembly of the operating member 1 of FIG. 1 and a motor vehicle steering wheel 17, wherein the operating member is disposed in the region of a spoke 16 of the motor vehicle steering wheel 17 extending between the steering wheel rim 15 and a steering wheel hub. In this case, the actuating part 2 is integrally formed, via the edge region 5, with a panel 13 extending about an impact absorber 14 covering the steering wheel hub. In this case, the support 20 from FIG. 1 and the panel 1 are rigidly connected to one another via a latching connection. FIG. 3 is the associated rear view of the actuating part 2 and the panel 13.

The invention claimed is:

1. An operating member, comprising:
a support;
an actuating part, which has an actuating surface facing towards an operator for the operator to carry out an operating input, and the actuating part further has an edge region, which is provided outside the actuating surface and via which the actuating part is supported on the support;
wherein the actuating part has a layer structure, defining the actuating surface, and the layer structure has at least two layers including one thermoplastic material each, and the two layers differ with respect to a modulus of elasticity;
wherein, in a transitional region between the edge region and the actuating surface, a layer with a smallest modulus of elasticity of the at least two layers, which is referred to as a highly elastic layer, has a greatest layer thickness, measured in a direction perpendicular to the actuating surface, as compared with a layer thickness of other layers of the layer structure in the transitional region, in order to provide an elastic compliance of the actuating part in a direction perpendicular to the actuating surface;
a force sensor disposed and/or acting between the support and the actuating part, in order to detect a displacement of the actuating part in the direction perpendicular to the actuating surface, wherein the force sensor is a contactlessly detecting force sensor; and
an actuator disposed between the support and the actuating part, the actuator exciting at least one of: a vibration and a movement of the actuating part so as to generate an active haptic feedback, wherein the actuator is fixed exclusively to the actuating part by at least one of a positive manner and a substance-to-substance connection.

2. The operating member according to claim 1, wherein, in the transitional region, a high-strength layer having a greatest modulus of elasticity of the at least two layers of the layer structure is removed, and at least the highly elastic layer remains.

3. A motor vehicle comprising the operating member according to claim 1.

4. The operating member according to claim 1, wherein a weakened-material portion in the layer structure, which at least in some areas surrounds the actuating surface, is formed in the transitional region.

5. The operating member according to claim 4, wherein the weakened-material portion is formed by a groove provided on a side of the actuating part facing away from the operator.

6. The operating member according to claim 5, wherein a high-strength layer having the greatest modulus of elasticity of the at least two layers of the layer structure extends substantially parallel to the actuating surface.

7. The operating member according to claim 1, wherein the highly elastic layer is formed from any one of: a thermoplastic elastomer and a thermoplastic vulcanizate.

8. The operating member according to claim 7, wherein the thermoplastic elastomer is a thermoplastic polyurethane, and wherein the thermoplastic vulcanizate is a vulcanizate comprising an ethylene-propylene-diene rubber.

9. The operating member according to claim 1, wherein the highly elastic layer has a Shore A hardness in a range from more than 55 to less than 95.

10. The operating member according to claim 9, wherein the highly elastic layer has the Shore A hardness in a range from 65 to 85.

11. The operating member according to claim 1, wherein the layer structure is a film layer structure containing a film.

12. The operating member according to claim 11, wherein the film is a polycarbonate film.

13. The operating member according to claim 11, wherein the film is an outer layer of the layer structure forming the actuating surface.

14. The operating member according to claim 13, wherein the film forms a common visible surface extending across the actuating surface, the transitional region and the edge region.

15. An assembly, comprising:
an operating member and a motor vehicle steering wheel, wherein the operating member comprises:
a support;
an actuating part, which has an actuating surface facing towards an operator for the operator to carry out an operating input, and the actuating part further has an edge region, which is provided outside the actuating surface and via which the actuating part is supported on the support;
wherein the actuating part has a layer structure, defining the actuating surface, and the layer structure has at least two layers including one thermoplastic material each, and the two layers differ with respect to a modulus of elasticity;

wherein, in a transitional region between the edge region and the actuating surface, a layer with a smallest modulus of elasticity of the at least two layers, which is referred to as a highly elastic layer, has a greatest layer thickness, measured in a direction perpendicular to the actuating surface, as compared with a layer thickness of other layers of the layer structure in the transitional region, in order to provide an elastic compliance of the actuating part in a direction perpendicular to the actuating surface; and a force sensor disposed and/or acting between the support and the actuating part, in order to detect a displacement of the actuating part in the direction perpendicular to the actuating surface, wherein the force sensor is a contactlessly detecting force sensor; and an actuator disposed between the support and the actuating part, the actuator exciting at least one of: a vibration and a movement of the actuating part so as to generate an active haptic feedback, wherein the actuator is fixed exclusively to the actuating part by at least one of a positive manner and a substance-to-substance connection wherein the operating member is disposed in a region of a spoke of the motor vehicle steering wheel extending between a steering wheel rim and a steering wheel hub.

16. The assembly according to claim 15, wherein the actuating part is integrally formed with a panel extending about an impact absorber covering the steering wheel hub.

17. The assembly according to claim 15, wherein the actuating part has a through-hole in which is disposed of any one of: an electronic input part and an electromechanical input part that is manually operated.

* * * * *